No. 748,500. PATENTED DEC. 29, 1903.
J. HEINRICH & F. PROBST.
BAG FILLER.
APPLICATION FILED MAY 9, 1903.
NO MODEL.

Witnesses
M. D. Blondell
C. Shaw

Inventors
J. Heinrich
F. Probst

Howard Brock
Attorneys

No. 748,500.

Patented December 29, 1903.

UNITED STATES PATENT OFFICE.

JOHN HEINRICH AND FRANK PROBST, OF KANSAS CITY, MISSOURI.

BAG-FILLER.

SPECIFICATION forming part of Letters Patent No. 748,500, dated December 29, 1903.

Application filed May 9, 1903. Serial No. 156,467. (No model.)

*To all whom it may concern:*

Be it known that we, JOHN HEINRICH and FRANK PROBST, citizens of the United States, residing at Kansas City, in the county of Jackson and State of Missouri, have invented a new and useful Bag-Filler, of which the following is a specification.

Our invention is an improvement in bag-fillers, and has for its object the economical and rapid filling of bags with grain or the like substance, and especially the filling of sacks from cars of loose grain. It is customary at present to sack the grain at the car, and when sacked in the usual way it ordinarily takes three men, two filling and one sewing the sacks, from six to eight hours to sack the grain carried by a forty-five-thousand-pound car.

Our invention consists of the novel features and combination of parts described hereinafter, particularly pointed out in the claims, and shown in the accompanying drawings, in which—

Figure 1:
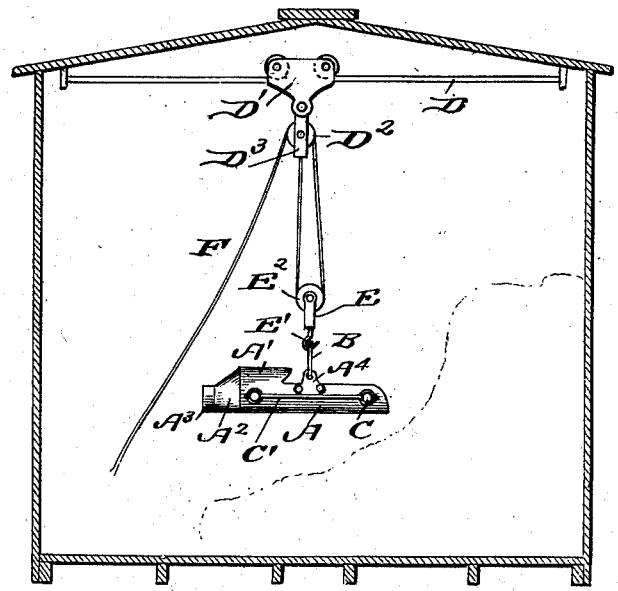
Figure 2:
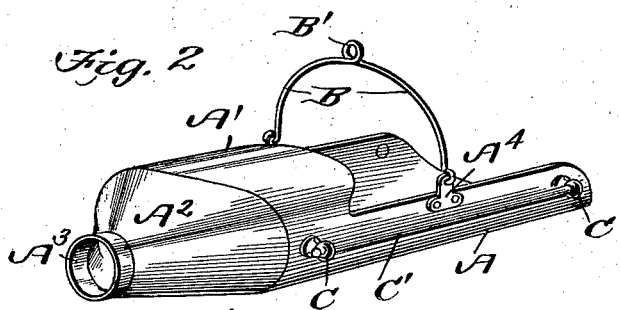
Figure 3:
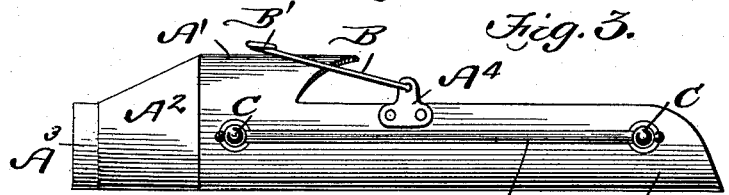
Figure 4:
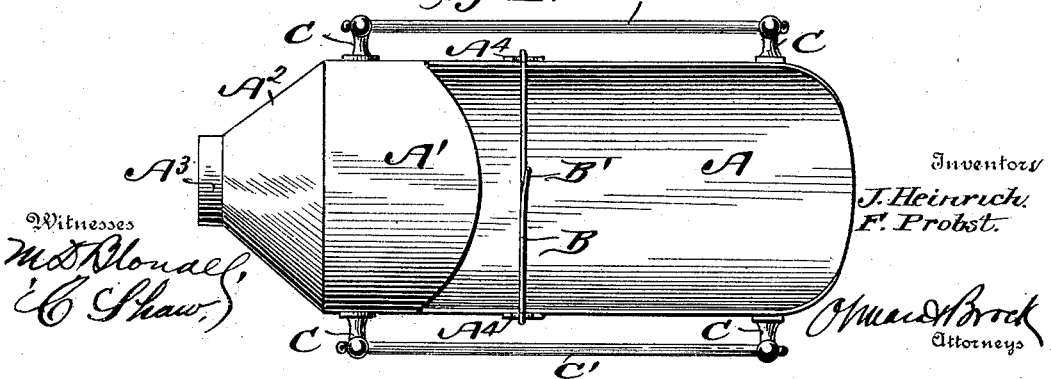

Figure 1 is a perspective view showing the practical application of our device. Fig. 2 is a detached perspective view of our scoop. Fig. 3 is a side elevation of the scoop, and Fig. 4 is a plan view of the same.

In the figures, A represents a grain shovel or scoop, the rear portion of the scoop being arched over, as shown at A', and adjacent the rear end the upper arched surface tapers downwardly and the sides of the scoop inwardly, as at $A^2$, terminating in the spout portion $A^3$. On each side of the scoop and about midway its length are upwardly-extending perforated ears $A^4$, in which are loosely and pivotally secured the ends of a bail B, an eye B' being formed centrally in the bail above the center of the scoop. Short stub-arms C project outwardly from the sides of the scoop adjacent each end, and carried by these arms are straight cylindrical bars C', connecting the two arms on each side and forming convenient handles by which the scoop may be manipulated.

When used in a car for purpose of unloading, a track D is arranged transversely across the car and a traveling truck D' mounted on same. A pulley $D^2$ is supported from this truck in a swinging frame $D^3$. A bracket E, having a hook E' at its lower end, carries a pulley $E^2$. The hook E' engages the eye in the bail, and a cable F is secured at one end to the frame $D^3$, passed down and around the pulley $E^2$, and thence upward and over the pulley $D^2$.

The operation of our device is as follows: A sack is secured on the spout $A^3$, the spout entering and distending the mouth of the sack. Four men are preferably detailed to each scoop, though it could be handled by three. Two of the four grasp the handles C', one on each side, and the scoop is swung forward into the mass of grain, the third man holding the cable F. The men at the handles then tilt the forward end of the scoop, and the grain therein runs through the spout into the sack, which is removed and sewed by the fourth man. A new sack is placed on the spout, and the operation is repeated.

Having thus fully described our invention, what we claim as new, and desire to secure by Letters Patent, is—

1. The combination with a movable, swinging bracket, of a scoop swingingly connected thereto and having a contracted spout at its rear end and horizontal handles on the sides of the scoop.

2. A grain-scoop open at its forward end, arched over adjacent its rear end and tapering to a discharge-spout at its rear end, a bail pivotally secured to said scoop, and rigid handles secured to the sides of the scoop.

3. A device of the kind described comprising an overhead track, a truck traveling on said track, a frame swinging below said truck, a pulley carried by said frame, a scoop having a spout at its rear end, handles on the sides of the scoop, a bail having an eye formed therein, said bail being pivotally connected to the scoop, a bracket, a hook on the bracket said hook engaging the eye of the bail, a pulley in the bracket, and a cable secured at one end to the swinging frame and passing over both the pulleys, as and for the purpose specified.

JOHN HEINRICH.
FRANK PROBST.

Witnesses:
FRANK GROLBERT,
ISAAC H. KINLEY.